May 13, 1958  G. FRIES  2,834,889
ELECTRONIC CAMERA
Filed June 8, 1953  3 Sheets-Sheet 1
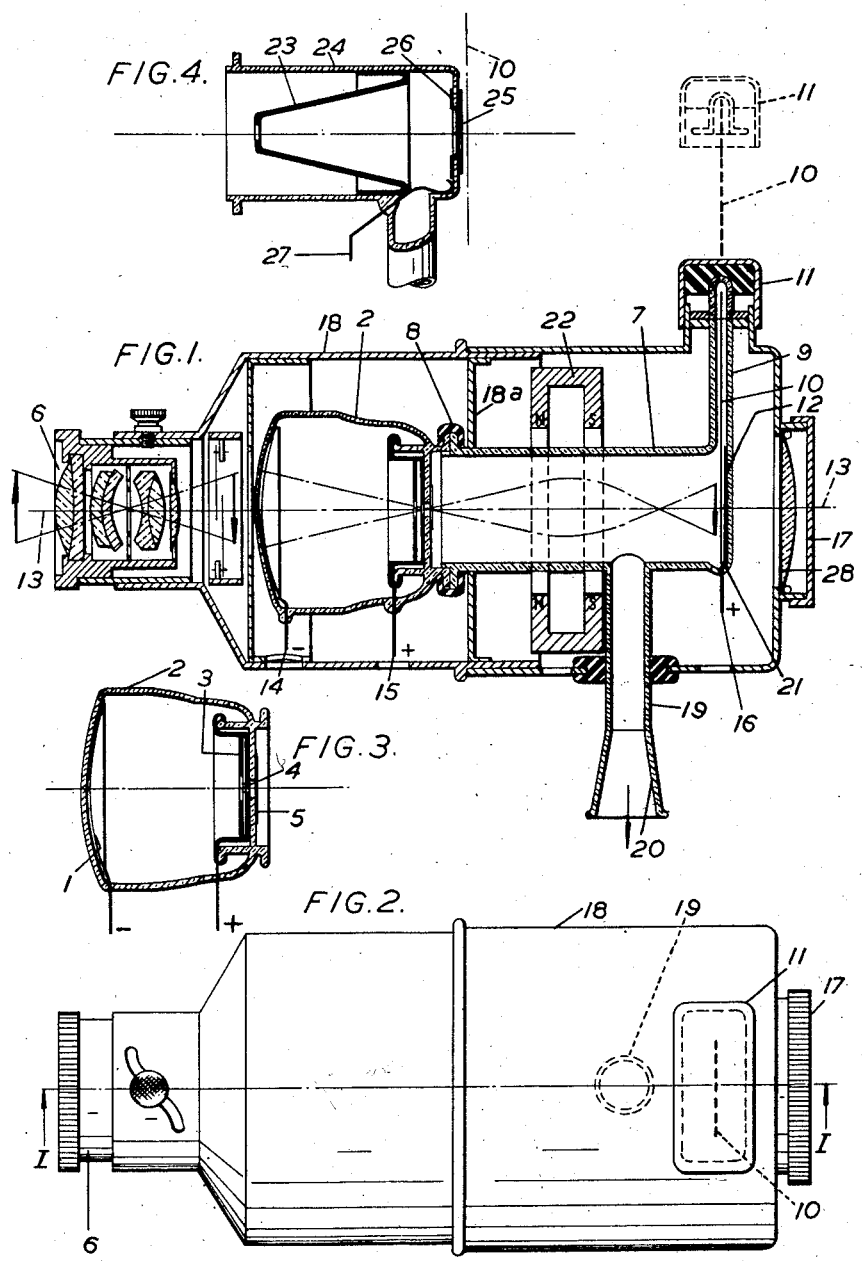
Inventor
GUSTAV FRIES
By
Holcombe Wetherill & Brisebois
Attorney May 13, 1958  G. FRIES  2,834,889
ELECTRONIC CAMERA
Filed June 8, 1953 3 Sheets-Sheet 2
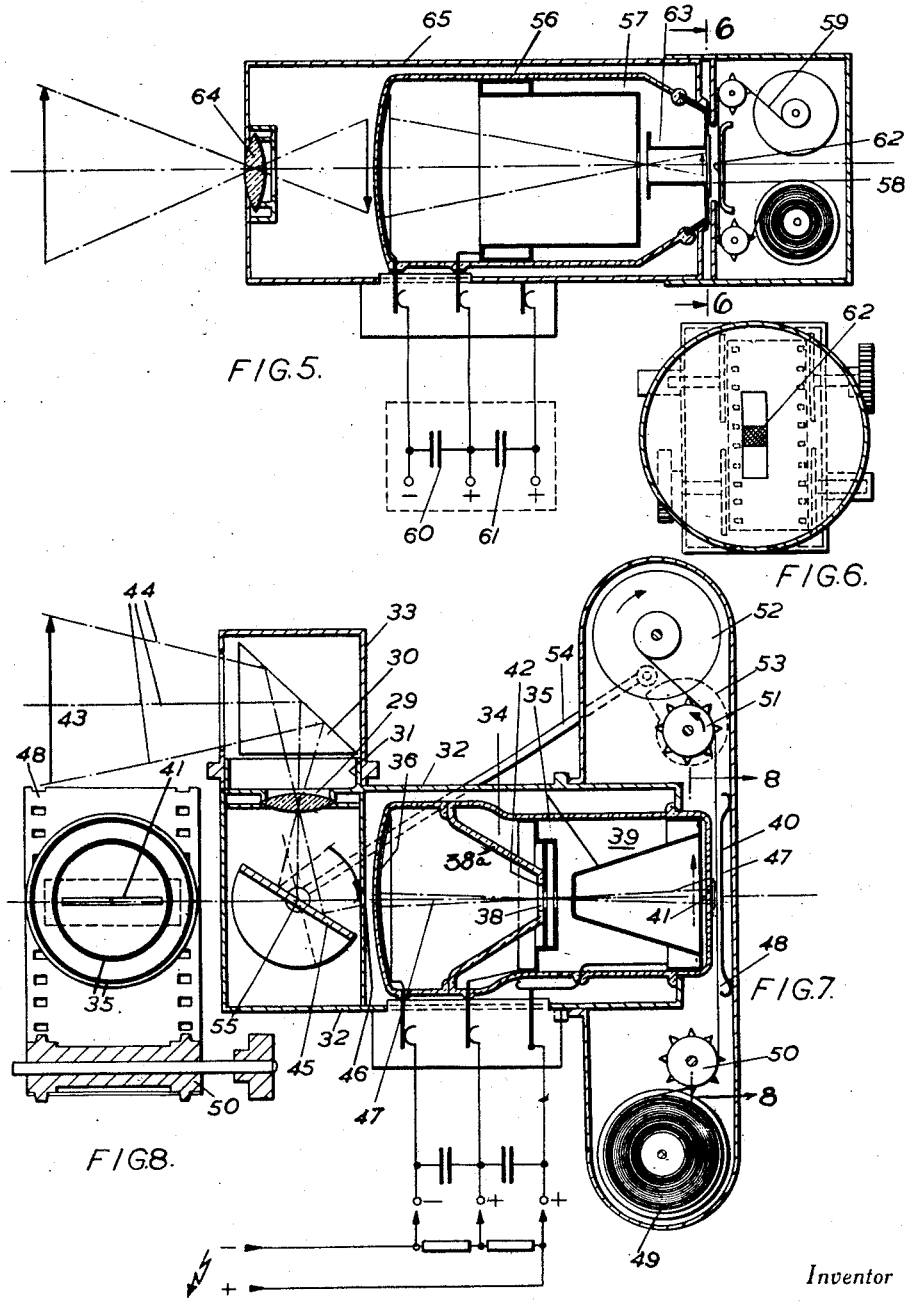
Inventor
GUSTAV FRIES
By
Holcombe Wethrell & Brunbois
Attorney May 13, 1958 G. FRIES 2,834,889
ELECTRONIC CAMERA
Filed June 8, 1953 3 Sheets-Sheet 3
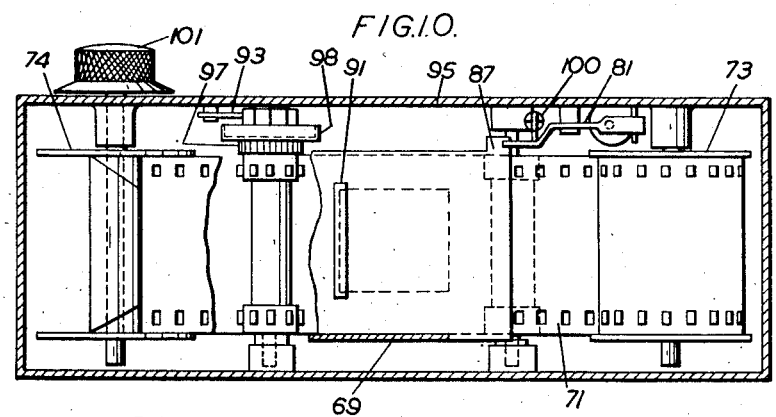
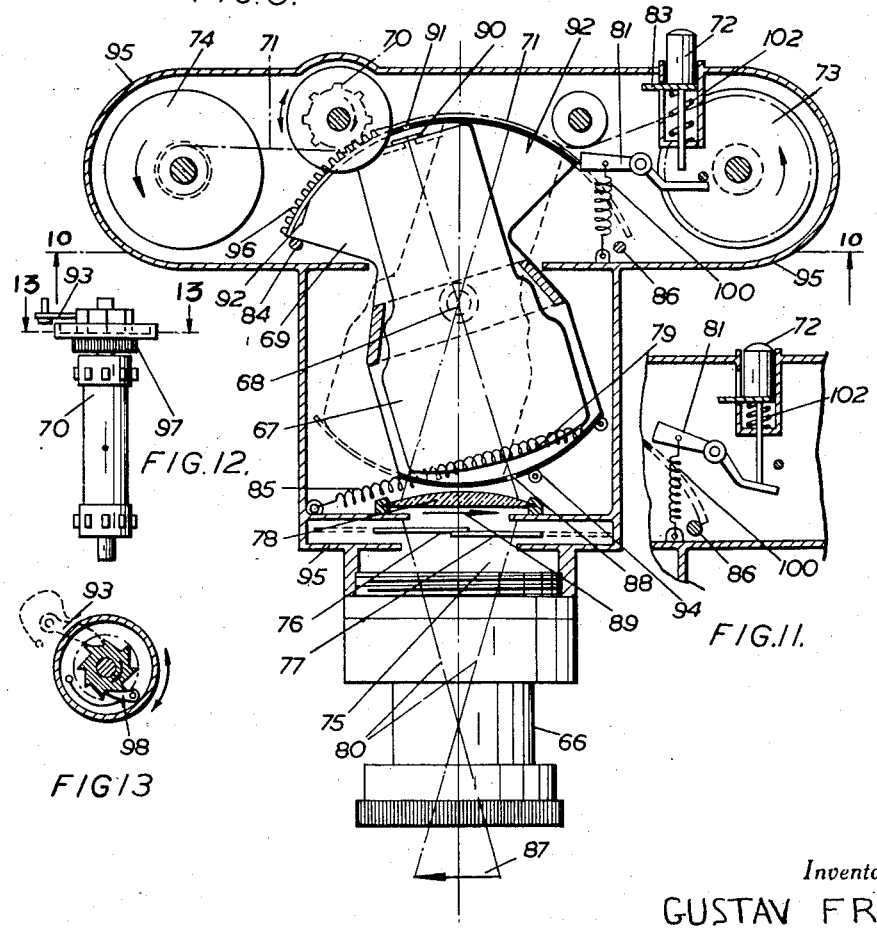
Inventor
GUSTAV FRIES
By
Holcombe Wetherill & Brisbois
Attorney

United States Patent Office 2,834,889
Patented May 13, 1958

2,834,889

ELECTRONIC CAMERA

Gustav Fries, Ostheim, near Hanau-on-Main, Germany, assignor to Julius Cato Vredenburg-Inglesby, London, England Application June 8, 1953, Serial No. 360,264

Claims priority, application Great Britain, June 10, 1952

21 Claims. (Cl. 250—49.5)

It is known that electron images can be recorded on photo-sensitive material, for example on photographic film, and this phenomenon is used to produce so-called electron micrograms by means of an electron-microscope, the film being positioned within the vacuum chamber.

It is also known to record electron images on a photo-sensitive material by photographing the visual image produced by the electrons on the fluorescent screen of a cathode ray tube, for example of a television receiver.

Whereas in the former case the electron image is recorded by direct action of the electrons upon the photo-sensitive layer, in the latter case it is the optical image on the screen which is recorded so that the recording is actually effected photographically and not electronically. Thus the second method does not take advantage of the much greater sensitivity of photo-sensitive material to electrons than to light radiation. In this connection it can be mentioned that a single electron, which may be released from a photo-cathode by the action of 100 photons, when accelerated, for example to 50,000 volts, is sufficient to expose an element of a photo-sensitive layer to produce, after development, a blackened image grain, whereas in the case of exposure of the layer to light radiation, 10,000 photons are required to achieve the same result. Thus a photo-sensitive layer is about 100 times more sensitive to the action of electrons than to the action of photons. In other words, in order to obtain the same degree of exposure of the photo-sensitive layer by direct action with photons as is obtained when the photo-sensitive layer is irradiated by electrons derived from the same optical image source, it would be necessary to increase the aperture of the photographic lens about 10 times in diameter.

The present invention consists in the use of an image converter for transforming the ray (for example light rays, X-rays or infra-red rays), from the image to be recorded into an electronic image which is directly focussed on to a photo-sensitive layer or some other layer which is sensitive to electrons. Since the cathode, for example a photo-cathode, serving for the image conversion, is expensive to produce and will become completely destroyed if it is exposed to air, the invention further consists in sealing this cathode in an evacuated chamber provided with an electron-permeable window through which the electrons released from the cathode and accelerated by appropriate means can pass out of the evacuated chamber to expose a photo-sensitive or other electron-sensitive layer disposed outside the evacuated chamber containing the cathode.

The invention also consists in an electronic camera for recording optical pictures on a photographic film in which an image converter tube is arranged between the optical lens and the film, the image converter tube having a photo-cathode upon which the optical image is focussed and an electron permeable window through which the electrons released from the photo-cathode leave the tube and are focussed upon the film.

A further feature of the invention consists in a unit incorporating an image converter tube which can be fitted to a normal photographic camera to convert it to an electronic camera.

It is known that high velocity electrons can pass through very thin foils of material. The electron permeability of the foils depends upon their thickness, which in practice lies between $2\mu$ and $20\mu$ and upon their specific gravity. Materials most suitable for the purpose include aluminium, beryllium, cellulose acetate ("Cellophane" or "Cellon") and mica.

In practice it is impossible to make electron permeable windows covering an area corresponding to the standard cinema film frame (19 mm. x 24 mm.) which are strong enough to seal a vacuum chamber, as they are ruptured by the atmospheric pressure during the evacuation process. It is undesirable, for the purposes of the present invention, to strengthen such a large window by supporting it with a close-meshed metal screen since the shadow of the screen would appear in the recorded image and the advantage of obtaining a rasterless image would be lost. By the expression "rasterless image" is meant an image which is not subdivided into lines or individual picture points as is the case with television pictures and half-tone printed pictures.

For this reason, according to a feature of the invention, the electron image originating from a photo-cathode (it may also originate from other cathodes, corpuscular radiation, protons, ions etc.) leaves the image converter through an electron-permeable window of such a small size that, for the thickness of the layer forming the window it can withstand the atmospheric pressure applied to it without rupture and without the necessity of supporting it by a metal screen. The window may be in the form of a slot, across which during each exposure the photographic film or other electron-sensitive carrier is caused to move continuously or vice versa, the electron image being rendered stationary relative to the carrier, for example by sweeping the electron image across the window in synchronism with the movement of the film, or by employing some other compensating movement. With this arrangement the exposure is effected in a manner similar to that obtained in photography by means of a focal-plane shutter.

In another embodiment the whole electron image is so reduced in size and the electron-permeable window is made so thick that the whole image can be recorded simultaneously on the film. In this case the film can remain stationary during recording. Such an arrangement is practicable, with the present electron-permeable materials, with electron-permeable windows having an area of 5.5 mm. x 4.5 mm. (that is corresponding to the frame size of an 8 mm. sub-standard cinema film) which is formed by a cellulose acetate or "Cellon" foil of $20\mu$ thickness.

It is known from the electron microscope art (where the resolution goes down to a minimum of 1–2 $m\mu$ as compared with that of an optical microscope which goes down only to 200 $m\mu$) that electron rays produce a much higher image resolution than light rays. This advantage is used, according to a feature of the invention, by projecting the light image to be recorded upon large area photo-cathode and reducing the size of the electron image thus produced by electron-optical means before recording the electron image. For example, an image which has been reduced by a ratio of 100–200 in the linear direction can still be recorded in all detail upon a photographic film, especially, for example, upon the grainless photo-sensitive collodium layers as have been known from the earliest days of photography. Thus the light image may be focussed on to a photo-cathode having an area of, for example, 40 x 50 mm., and the electron image released therefrom may be reduced by electron-optical means to 4 x 5 mm. and passed through an electron permeable window of this size for recording on 8 mm. sub-standard cinema film. Since the electrons possess up to 100 times greater intensity than photons, depending upon the accelerating voltage applied, even photo-sensitive materials of very low sensitivity (more particularly grainless collodium layers) are exposed sufficiently to permit cinematographic recordings to be made at speeds of 25 or more frames per second. Furthermore, the image resolution on such substandard 8 mm. cinema film produced in this manner is still up to 20 times (in the linear direction) better than a direct exposure with light upon a 35 mm. standard cinema film.

It will, therefore, be apparent that the image generation by corpuscular rays and the recording thereof upon photographic or other electron sensitive carrier according to this invention offers a great number of possibilities in science and engineering.

The invention may be carried out by either of two methods. In both methods electronic images are generated, optically or by some other influence, upon, for example, a photo-cathode, and are focussed electron-optically (electrostatically and/or magnetically) to form a rasterless image thereof upon a carrier sensitive to electrons. In one of the two methods this carrier is placed outside the vacuum chamber in which the electron image is generated, while in the other the electron-sensitive carrier is introduced into the vacuum chamber or passes through the latter, precautions being taken to prevent the medium serving for the conversion of the rays (photo-cathode) from being destroyed by the action of gases (e. g. the oxygen of the air).

The present invention makes use of the results of recent developments in the art of image converters and of the phenomena known under the collective name "electron ballistics" relating to the movement and paths of corpuscular rays (electrons, ions, protons etc.) for the conversion and recording upon suitable carriers (films coated with photo-sensitive emulsions or films with alkali halide layers as described in my United States Patent No. 2,707,162, dated April 26, 1955) of images which are of optical or electrical origin.

In order that the invention may be more clearly understood, reference will now be made to the accompanying drawings, in which:

Fig. 1 is a section on line I—I of Fig. 2 of an apparatus for carrying out the invention.

Fig. 2 is an external view of the apparatus according to Fig. 1.

Fig. 3 shows the image converter unit,

Fig. 4 shows an alternative unit for the image formation which incorporates electrostatic means for electron focussing, Fig. 5 shows an embodiment of a camera for 8 mm. and 16 mm. film, Fig. 6 is a section on line 6—6 of Fig. 5, Fig. 7 shows an embodiment of a camera for 35 mm. film, Fig. 8 is a section on line 8—8 of Fig. 7, Fig. 9 is a section of an alternative construction of camera suitable for 35 mm., Fig. 10 is a section on line 10—10 of Fig. 9, without the image converter, part of its mount and of the film being broken away, Fig. 11 is a detail of Fig. 9 showing the release button in a different position, Fig. 12 is another detail, showing the film feed drum, and Fig. 13 is a view on the line 13—13 of Fig. 12.

In the apparatus herein described, the image converter incorporating a photo-cathode for converting the light or other radiation images (for example X-ray images, infra-red images, or heat images) into electron images, is constructed as a separate unit as shown in Fig. 3 with the photo-cathode 1 thereof produced in a separate vacuum vessel 2. The electrons liberated from the photo-cathode 1 by the action of light are attracted towards an accelerating anode 3 to which a positive voltage is applied. The anode 3 may be arranged to form an electrostatic lens or to form part of such a lens, the rear stop aperture 4 of which is closed by an electron-permeable window 5, for example of aluminium, cellulose acetate film, or mica, which thus seals the vessel in a vacuum-tight manner.

In the electronic camera shown in Figs. 1 and 2, an image converter unit as shown in Fig. 3 is arranged behind the optical lens system 6 by which a light image is focussed upon the photo-cathode 1. Against the flanged end of the glass vessel 2 of the image converter abuts the flange of a glass vessel 7, the two flanges being held together by a rubber ring 8. The rubber ring also seals the joint. The glass vessel 7 is provided at its rear end with a chute 9 of rectangular cross-section through which a photographic film 10 may be introduced into the vessel 7, whereafter the chute 9 is closed by a cover 11. On the rear wall of the vessel 7 is provided a fluorescent screen 12 the centre of which is disposed in line with the optical axis 13 and which has a very thin aluminium film vapour deposited thereon in known manner, which film acts as a final anode. Through the conductors 14, 15, 16 the required operating voltages are supplied to the electrodes 1, 3 and 12 respectively.

An annular permanent magnet 22 serves for magnetically focussing the electron image on to the film 10 or the screen 12. This magnet 22 might obviously be replaced by an electro-magnetic lens.

A magnifying lens 28 permits the screen 12 to be viewed for focussing the electron image thereon before the film is introduced into the camera. This lens 28 is covered by a cover 17 in a lightproof manner prior to the introduction of the photographic film 10. Finally the whole of the electron-optical components are enclosed in a lightproof metal housing 18 which contains any necessary light screens, such as 18a. Through the housing 18 projects a pump connection tube 19 which is sealed into the vessel 7 and has a ground conical seat 20 adapted to be connected to a high vacuum pump by which the interior of vessel 7 can be evacuated. Owing to the small size of the chamber 7 to be evacuated, a small X-ray pump (e. g. Pfeiffer No. 1810, final vacuum $10^{-5}$ mm. Hg) is capable of evacuating the chamber to a sufficient degree to enable electron image recording to be effected within five minutes from the introduction of the film, so that it is possible with the apparatus described to carry out electron image recordings with the film material in a vacuum chamber at 6 minute intervals while changing the film after each recording.

The chute 9 of vessel 7 may also be extended to the opposite side of the vessel beyond the point indicated at 21, the film guiding chute or channel being formed so narrow that it will be substantially closed by the film passing therethrough. In this case the film 10 may be moved through the chamber 7 from one side to the other without it being necessary for the chute 9 and the chute opposite to it to be sealed. Obviously in this case a pump of greater capacity must be employed.

Preferably, however, for such use, the vessel 7 is replaced by one according to Fig. 4. In the latter an anode cone 23 is provided, and the back wall of the glass vessel 24 is apertured, the aperture being closed by an electron-permeable window 25. In order to permit the back at 26 still to act as the final anode, an extremely thin metal layer (e. g. 0.1µ aluminium) is vapor-deposited upon the latter. In this case the anode voltage for the anode cone 23 and the final anode is applied to connection 27.

When this apparatus is used, the image electrons act upon the film 10 arranged outside the vacuum chamber since the electrons pass through the window 25 provided they are sufficiently accelerated, which is easily possible up to as much as 50,000 volts.

The apparatus according to Fig. 4, being an electrostatic electron lens system, has the additional advantage that it does not produce rotation of the image, which is inherent in the use of a magnetic electron lens.

On the other hand, the image rotation in the case of magnetic lenses may readily be compensated optically, for example by the use of a rotatable deflecting prism 30 as shown in Fig. 7. In this case a deflecting prism 30 is mounted above the objective 29 so as to be rotatable about a cylindrical projection 31 provided on the camera housing 32. When the prism housing 33 is turned, the image in front of the photo-cathode is also turned by a corresponding angle.

However, this feature is not essential for the electron camera according to Fig. 7, since in this embodiment the focussing of the electron image is effected by an electrostatic electron lens system 35 which is incorporated in the image converter 34. The photo-cathode 36 is mounted in a vacuum chamber 42 of conical shape which at the apex of its conical wall portion 38a has an aperture 38 closed by an electron-permeable foil, behind which, in a second separate vacuum chamber 39, the electron lens system 35 is arranged. In the end wall 40 of the chamber 39 is a gap-like or slot-like aperture 41 (see also Fig. 8) which is closed by an electron-permeable foil. The wall portion 38a forms a partition wall between the vacuum chambers 42 and 39. Although both vacuum chambers are, after evacuation, permanently separated from the pump connection by sealing off the envelopes, the double electron-permeable window arrangement has the advantage that, should for any reason the foil over the aperture 41, which is exposed to the atmosphere, develop a leak, the photo-cathode 36 is nevertheless still protected from the air leaking into chamber 39 by the second foil over the aperture 38. The image converter may, in such an event be easily repaired by cementing a new foil over the aperture 41 and re-evacuating the chamber 39.

The method of recording an optical image impression by means of the electronic camera according to Fig. 7 is as follows. The image-focussing rays 44 originating from an object (indicated by arrow 43) are formed into an optical image in front of the slot-like aperture 46 through the medium of the totally reflecting prism 30, the objective 29, and the movable mirror 45. Through the area of the aperture 46 a portion of the optical image reaches the photo-cathode 36 of the image converter 34. The photo-cathode 36 converts the portion of the light image into an equivalent electron radiation 47. The electron rays 47, accelerated and focussed by the electron lens system 35, arrive at the aperture 41, and due to their high velocity, they penetrate the foil closing the gap 41, and irradiate the photographic layer on the film 48 to record the image portion thereon.

The film 48 is wound from a supply spool 49, over toothed rollers 50 and 51, and wound up upon the spool 52. In order to enable the whole image impression accepted by the objective 29, and not only the image portion passed by the width determined by the slot-like aperture 46, to be recorded on the film 48, the mirror 45 is tilted in synchronism with the movement of the film 48 past the slot-like aperture 41, the light image being moved past the aperture 46 in a direction opposite (due to the electron-optical reversal of the image) to that of the film 48. The control of the movement of the mirror 45 is effected, in the example referred to, by the movement of the film 48 over the toothed roller 51 to the shaft of which is secured a cam disc 53 which actuates a lever 54 to swing the mirror 45 back and forth about its pivot 55.

It is pointed out that this cam arrangement is only shown diagrammatically in the drawing, since a cam with the dimensions shown would not turn the mirror 45 through the angular distance necessary for recording the whole image accepted by objective 29, the drawing being only intended to illustrate in principle one of many ways in which the compensation of image and film movements may be effected. For example, the compensation may be effected by electrically deflecting or sweeping an electron image corresponding to the complete picture image across the slot 41, but in this case more technical apparatus is required.

When recording images on 35 mm. cinema film with the electronic camera according to the invention it is, at the present time, necessary to employ slot-like, that is to say narrow, apertures for permitting the electrons to escape from the vacuum chamber because the required very thin electron-permeable foils will not, if made of large-area, withstand the atmospheric pressure.

In Fig. 5 there is illustrated an embodiment of an electronic camera in which the image is electron-optically reduced in size, whereby the size of the window required for the image-forming electron rays to escape from the vacuum chamber may be correspondingly reduced. For recording the images sub-standard cinema film, such as the well known 8 mm. or 16 mm. films, are employed. The normal image area at 62 in the case of 8 mm. film is 4 x 5 mm. In this embodiment, too, an image converter 56 having electrostatic electron lenses 57, 63 is shown. The image converter however has only a single electron-permeable foil 58 at the point at which the image electrons leave the vacuum chamber in order to impinge on the film 59 at 62.

The electronic camera according to Fig. 5 operates on exactly the same principle as that described with reference to Fig. 7, except that there is no need for the optical compensation by the mirror 45 of Fig. 7, owing to the fact that the whole area of the electron image is able to leave the vacuum chamber simultaneously. The voltage required for the operation of the image converter 56, originating from a high-tension tube generator, is stored in condensers 60, 61. Tests have shown that it was sufficient, in one example, for these condensers to be charged once to 20 kv. in order to keep the image converter in operation for 10 minutes. In this case the condensers had a capacity of 0.1 $\mu f$. For continuous operation the high voltage may also be supplied by means of a small electrostatic influence machine, such as a Van de Grafft generator driven by an electromotor supplied from a 4.5 volt torch battery.

When the electronic camera according to the invention is used in a studio, there is no difficulty in supplying the high voltage, which may readily be obtained through transformers and rectifiers from electric supply mains. In the image converters 56 shown in Fig. 5, the foil 58 is, according to a further feature of the invention, cemented to the final electrode 63 of the electron lens system, this electrode 63 forming part of the housing of the image converter. In view of the smallness of the image area, the image converter may even be made so small that it and the lens 64 can be mounted together in a tube 65 adapted to serve as an attachment to any standard miniature camera, thus transforming the latter into an electronic camera.

In order also to save the cost of an extra lens 64, the tube 65 may, according to a further feature of the invention, be constructed as a unit adapted to be fitted into the lens mount of an ordinary camera, the existing camera lens being inserted in a mounting at the opposite end of the tube in front of the photo-cathode.

It will be evident from the preceding description that the electronic camera according to the invention may be employed with advantage in many cases in which, at present, standard cameras or even special cameras are employed.

One of the advantages offered by the electronic camera is that one and the same film material may always be used since the sensitivity of the film need only be suited to the electrons. The sensitivity of the photo-cathode may be adapted in each case to the intended use. Exposures may thus be made on one and the same film material within the range of light wave lengths between $1\mu$ and 300 m$\mu$ and the range may be further extended into the infra-red range up to wave lengths of $3\mu$ by employing for the conversion of rays, semi-conducting layers, such for example as bismuth-selenide or lead-sulphide layers. (See Fiat Review of German Science 1939–1946, Electronics, Part I, published in 1948 by the Office of Military Government of German Field Information Agencies Technical.) In this case the construction of the image converter is different from that described, but even in the case of the semi-conducting image converters, the electronic radiation representing the converted image is, by suitable subsequent acceleration caused to leave the vacuum chamber in order to expose a film placed outside said chamber.

The use of an image converter, particularly a semiconducting image converter, in the electronic camera according to the invention also leads to the advantage of permitting the electronic image to be additionally and selectively enlarged between the ratios of 1:1 and 1:20, a fact which is more particularly desirable in cinema photography since it avoids the necessity of having to change the position of the cine camera when changing from close-ups to long range exposure and vice versa, since the electron-optical enlargement in this case is equivalent to a continuous variation in the focal length of the lens for the light image.

Figs. 9 to 13 illustrate another embodiment of electronic camera which hardly differs in appearance from an ordinary miniature camera. The picture size which can be obtained on the film corresponds to that obtainable with miniature cameras employing 35 mm. cinema film.

Since, however, electron-pervious windows as at present available will not, unless supported by a grid, withstand the atmospheric pressure in an area of for example 19 x 24 mm., a slot-like window has been provided similarly as has been described hereinabove with reference to Fig. 7, with the difference however that contrary to the embodiment of Fig. 7, the film remains stationary during the exposure, and the electron-optical means are moved.

The camera, according to this embodiment, comprises a lens 66, an image converter 67 equipped with electron-optical means (for example as shown in Fig. 7), a movable support 69 which is tiltable about an axis 68, and on which the image converter 67 is secured, and a toothed film feed sprocket 70 (shown separately in Figs. 12 and 13), over which the film 71 is passed. A release button 72 is shown in Fig. 11 in the pressed (release) position, while in Fig. 9 it is shown in its normal position. All the above-mentioned parts are arranged, with the film supply spool 73 and the take-up spool 74, in a light-proof housing 95 having a front opening 75 forming a mount for an interchangeable camera lens 66. Between the latter and the image converter 67 there are arranged a set of shutter segments 76 and 77 and a correcting lens 78. The correcting lens 78 serves the purpose of preventing image distortion on the spherically curved part 79 of the image converter 67, behind which the photo cathode is arranged. The segments 76 and 77 open to admit the image-forming light rays 80 to the photo cathode at the back of the wall 79 of the image converter as soon as the release button 72 is pressed and before the latter actuates the release lever 81. A pin 83 of the release button 82 actuates the shutter segments 76, 77 through a linkage (not shown), so that depression of the release button causes the segments, which are operatively connected with the pin 83, to move into the position shown in broken lines. When the button 72 is released a spring 102 will return the button and the segments 76, 77 to their original positions.

In Fig. 9 the camera is shown in the "ready" position, that is to say, the image converter 67 on its support 69 has been moved against the stop 84. The tensioned spring 85 urges the parts 67, 69 back towards the stop 86, this movement being prevented by the lever 81 which, urged by spring 100, latches in front of the lug 87 of the support 69.

When the release button 72 is pressed (position of Fig. 11), first the shutter segments 76, 77 open to allow light rays from the object 87 to impinge on the photo-cathode; then the locking of the support 69 by lever 81 is released, and spring 85 pulls the support with the image converter 67 back towards the stop 86. During this time the photocathode, which is exposed through the slot-like aperture 88, in the front wall of the support, passes across the light image 89 formed by the lens 66. This light image is converted, in the image converter 67, into an electron image which leaves the image converter through an electron-permeable window 90 arranged at the rear end thereof, and then, after passing through a slot 91 in the rear curved wall 92 of the support 69, impinges upon the film 71 and exposes the latter.

The perforated film 71, which extends over the wall 92 and is applied to the latter under tension and into the perforations of which the teeth on the sprocket 70 engage, is prevented from participating in the movement of the wall 92 from stop 84 to stop 86, since the sprocket 70 is prevented by a pawl 93 from rotating in this direction.

When, however, the support is moved towards the stop 84 by means of the knob 94, which is secured to the support and projects outwardly through the housing 95, the teeth 96 at the rear end of the support engage a pinion 97 which is freely rotatable on the shaft of the sprocket 70 in one direction (anti-clockwise in Fig. 9) and is locked thereto in the other direction by a pawl 98 to turn the sprocket and thus advance the film 71 by the length of one picture frame. When the support 69 has been pulled back to stop 84, the lever 81, urged by spring 100, again latches in front of the lug 87 on the support 69, and the camera is thus ready for another exposure.

It remains to be mentioned that in the embodiment of the electronic camera as shown in Figs. 9–13, the supply of the operating voltage to the image converter is preferably effected through the two bearings at opposite sides of the support 69.

The winding up of the exposed film 71 is, in the illustrated embodiment, effected by turning a knob 101 on the take-up spool 74, but there is no technical difficulty involved in winding the spool 74 automatically. For this purpose the take-up spool may be coupled with the pinion 97 through gearing with an interposed clutch. The movement of the support 69, to the "ready" position instead of being effected by the abutment 94, may alternatively be effected by means of a rotatable knob connected with the pawl 98.

The invention also offers to cine photography new possibilities for the production of trick films since the electronic camera permits the image to be distorted according to requirements by electric or magnetic influences upon the passage of the rays. On the other hand optical distortions of the image may be be corrected in a similar manner.

Although electron images can only be recorded in black and white, colour records may also be made by recording filtered component images which may either be projected again through filters or printed photographically through filters. The electronic camera may also be employed with advantage in the art of reproduction for the production of printing plates, in colour printing for the production of colour printing plates without touching up, and in compositing machines for the production of printing forms (photo compositing machines).

Whilst particular embodiments have been described, it will be understood that various modifications may be made without departing from the scope of the invention. Thus, for example, an electron-permeable layer may be applied directly upon the photo-cathode after the forming process, this layer serving to seal the photo-cathode against the atmosphere. Upon the outer surface of this layer, i. e. on its surface which is not in contact with the photo-cathode, charge images will be produced which are capable of being focussed electron-optically on to the film.

I claim:

1. A photographic camera comprising a camera housing having a lens; a diaphragm stop associated with said lens, an evacuated envelope the wall of which includes a light-pervious portion and an electron-pervious material window including a continuous, self-supporting part; an electrode having a photo-emissive surface within said evacuated envelope adjacent said light pervious wall part thereof and spaced from said electron-pervious window so as to emit electrons according to a distribution pattern determined by the light falling through said light pervious wall portion, said envelope being mounted in said housing with said photo-cathode in imaging relation to said lens; electron-optical means for accelerating and focussing electrons emitted from the photo-cathode so as to cause said electrons to pass through said window and form outside said envelope a sharply focussed electron image of at least part of said photocathode area; an electron-sensitive record-receiving element, and means for supporting said record-receiving element in said housing outside said envelope in such a position that said sharply focussed image is formed on the record-receiving surface of said element.

2. A photographic camera, comprising a camera housing having a lens for forming an optical image within the camera housing, an evacuated envelope mounted within said camera housing and having a transparent wall, a photocathode surface arranged within said envelope and facing said wall in such position that said image is formed on said surface, a narrow, strip-like self-supporting electron-permeable material window in the wall of said envelope opposite said photocathode surface, means for accelerating and focussing photo-electrons emitted by said photocathode so as to pass through said window and form in the camera housing outside the tube an electron image of a strip-like area of the photocathode surface, the camera further comprising means for producing relative movement between said optical image and said photocathode surface transversely to the longitudinal direction of said strip-like area, means for supporting an electron-sensitive record receiving element inside the camera housing in such position that said electron image is formed thereon, and means for producing relative movement between such record receiving element when thus supported and said electron image transversely to the longitudinal direction of said strip-like area and in synchronism with the relative movement between said optical image and photo-cathode.

3. A photographic camera comprising a camera housing having a lens for forming an optical image within the camera housing; an evacuated envelope mounted within said camera housing and having a transparent wall, a photocathode surface provided within said envelope and facing said wall in such position that said image is formed on said surface, a narrow, strip-like electron permeable window in the wall of said envelope opposite said photocathode surface, means for accelerating and focussing photo-electrons emitted by said photocathode so as to pass through said window and form in the camera housing outside the tube an electron image of a strip-like area of the photo-cathode surface, the camera further comprising an image reflecting element for reflecting the image-forming optical rays from said lens on to said photocathode surface, means for rotating said image-reflecting element about an axis parallel to the longitudinal direction of said window for sweeping said image across the photocathode, means for supporting an electron-sensitive record-receiving element inside the camera housing in such position that said electron image is formed thereon, means for moving such record receiving element when thus supported transversely to the longitudinal direction of said strip-like area in synchronism with the sweep movement of said optical image across the photocathode.

4. A photographic camera as claimed in claim 3, wherein a second fixed image-reflecting element is additionally interposed in the path of the image-forming optical rays arriving at the photocathode to compensate the mirror-reversing effect of the movable image-reflecting element.

5. A photographic camera, comprising a camera housing having a lens for forming an optical image within the camera housing, an evacuated envelope mounted within the camera housing for pivotal movement about an axis parallel to such image and having a transparent wall facing said lens, a photocathode surface fixed within said envelope and facing said wall in such position that said image is formed on said surface, a narrow, strip-like self-supporting electron-permeable material window in the wall of said envelope opposite said photocathode surface, the longitudinal direction of said window being parallel to said axis, and means for accelerating and focussing photo-electrons emitted by said photo-cathode so as to pass through said window and form in the camera housing outside the tube an electron image of a strip-like area of the photocathode surface, the camera further comprising means for supporting an electron sensitive record receiving element inside the camera housing in such position that said electron image is formed thereon, and means for tilting said envelope relative to the camera housing about said axis.

6. A photographic camera as claimed in claim 5, wherein said tilting means include a spring means connected to said envelope so as to urge it about said axis towards an end position, catch means for retaining said envelope against the force of said spring means in a starting position, and trigger release means for releasing said catch means.

7. A photographic camera as claimed in claim 5, wherein said envelope is provided with a shade element covering said photocathode against light from the lens, said shade element having a narrow, elongated aperture permitting access of such light to said strip-like photocathode area.

8. A photographic camera as claimed in claim 5, wherein said supporting means include a film supply spool, a film take-up spool, and means for guiding a film between said spools to follow a part-cylindrical path about the pivot axis of the envelope.

9. An image-converter tube, comprising a gas-tight envelope, a wall by which the interior of said envelope is sub-divided into two separate compartments, said wall having a material electron-pervious window, a photocathode in one of said compartments, said one compartment being evacuated, means in the wall of the other said compartment for enabling the same to be connected to evacuating means, and electron-optical means for accelerating and focussing electrons released from said photocathode to cause such electrons to pass through said window into said other compartment.

10. Apparatus as claimed in claim 9, wherein an electron-sensitive record-receiving element is arranged within that part of the evacuated envelope which is separated by said partition from the part containing the photocathode, the part containing said record-receiving element being provided with connecting means for evacuating the same.

11. An image-converter tube as claimed in claim 9, wherein a second electron-pervious material window is provided in the wall of the envelope enclosing the second compartment, the electron-optical means being such as to accelerate and focus electrons from said photocathode so as to move through both said material windows in succession and form outside said envelope an electron-image of the photocathode.

12. A photographic camera, comprising a camera housing having a camera lens for producing an optical image, an image converter tube mounted in said housing and having a large-area photocathode so located in the camera housing that said optical image is formed on said photocathode, and having in its wall opposite said photocathode a material electron-permeable window including a non-supported area of smaller dimensions than said photocathode, the camera also comprising means for focussing and concentrating electrons emitted from said photocathode so that all electrons emitted from the image area of said photocathode will pass through said smaller non-supported area of the window and form outside the tube an electron image of said picture area, and means for supporting an electron-sensitive record-receiving element in said camera housing outside said envelope so that said electron image is formed on said receiving element.

13. Apparatus as claimed in claim 12, wherein said unsupported area of the electron-pervious window measures approximately 5.5 mm. by 4.5 mm.

14. An image converter tube comprising an envelope having a transparent wall portion, electrode means in said envelope, including a photocathode adjacent said transparent wall portion, a first electron-pervious material window in the wall of said envelope substantially opposite to said transparent portion and photocathode, a partition wall subdividing said envelope into two compartments in a gas-tight manner, said wall being sufficiently strong to withstand one-sided pressure of the atmosphere, and being formed with a further electron-pervious material window substantially aligned with said photocathode and said first electron-pervious window.

15. An image converter tube comprising an evacuated envelope having a transparent end wall and a second end wall being approximately parallel to said transparent end wall and having an electron-pervious material window, a photo-emissive cathode arranged within said envelope adjacent said transparent end wall, a partition wall, also having an electron-pervious material window and extending across said envelope so as to subdivide the interior thereof into two compartments separated from each other in a vacuum-proof manner, and electrostatic means for accelerating and electron-optically focussing electrons released from an area of said photo-emissive cathode so as to concentrate the flow of electrons from said area as to wholly pass through the electron-pervious window in said partition and through said window in said second end wall and form outside said evacuated envelope a sharply focussed electron image of the electron emission pattern of said photocathode area.

16. An electronic camera, comprising a camera housing having a lens, an evacuated envelope mounted in said housing and having a transparent end wall and a second end wall being approximately parallel to said transparent end wall and having an electron-pervious material window including a non-supported area, a photo-emissive cathode arranged within said envelope in imaging relation to said lens through said transparent end wall, a partition wall also having an electron pervious material window including a non-supported area and extending across said envelope so as to subdivide the interior thereof into two compartments separated from each other in a vacuum-proof manner, electron optical means for accelerating and focussing electrons released from an area from said photo-emissive cathode for so concentrating the electron beam moving from said area as to wholly pass through said nonsupported area of each of said electron-pervious windows in succession and to form within the camera housing a sharply focussed electron image of the electron emission pattern of said photocathode area outside said evacuated envelope.

17. An image converter tube comprising an evacuated envelope having a transparent end wall and a second end wall approximately parallel to said transparent end wall, a photo-emissive cathode arranged within said envelope adjacent said transparent end wall, said second end wall being formed with an electron-pervious material window through which electrons released from said cathode can be caused to move out of said envelope, a partition wall extending across said envelope so as to subdivide the interior thereof into two compartments separated from each other in a vacuum-proof manner, said partition wall being formed with an electron-pervious material window so arranged that electrons released from said photo-emissive cathode can be caused to move in succession through the electron-pervious window in the partition and the electron-pervious window in the second end wall to leave the evacuated envelope.

18. An electronic camera comprising a camera housing having a lens, means for supporting an electron sensitive member in said housing, said means determining an image-receiving surface, an electronic image converter having an evacuated envelope mounted in said housing for pivotal movement, an electron-emitting cathode in said envelope in imaging relation to the lens, said envelope being formed with a narrow elongated electron-pervious window facing the image receiving member, the longitudinal direction of said window being parallel to said pivot axis and means for tilting said envelope in the housing about said pivot axis to sweep said window across said image-receiving surface.

19. An electronic camera comprising a camera housing having a lens at one end of the housing a pair of film supply and take-up spools arranged in spaced relation to each other at the opposite end of the camera housing, means for guiding a strip of film between said spools across the housing and determining an image-receiving surface, means for engagement with such film on its path between said spools to advance it from said supply spool to said take-up spool, an evacuated envelope having a photocathode adjacent one end and having at its opposite end an end wall formed with an electron-pervious material window having a narrow, elongated unsupported area, electrostatic means in said tube for accelerating and focussing electrons emitted from a narrow elongated area extending across the surface of said photocathode, said electrostatic means being so arranged as to cause the electrons from said area of the photocathode surface to pass out of said envelope through said non-supported area of the electron-pervious window and form a sharply focussed electron image of said photocathode area outside said window, on said image-receiving surface, a frame for supporting said envelope within the camera housing in such spatial relationship to the lens and the film-guiding means that said photocathode surface is located within the focussing field of the lens, pivotal supporting means for supporting said frame in the camera so as to be movable about an axis parallel to the longitudinal direction of said unsupported window area and perpendicular to the optical axis of the lens and to the direction of said film-advancing movement, said frame comprising an opaque member interposed between the lens and envelope and having a window pervious to light rays, which is of elongated, narrow shape and is so arranged as to permit light to pass from the lens to said photocathode area, and a member opaque to cathode rays interposed between said second wall and said image-receiving surface, said second member having a narrow elongated aperture to permit the electron rays passing through said window to reach the path of the film, both said members being shaped as surfaces of revolution coaxial with the axis about which said frame is pivoted, spring means for urging said frame to swing about said pivot axis into an end position, catch means for retaining said frame against the action of said spring means in a starting position, trigger means for releasing said catch means, loading means for moving said frame from said end position into said starting position and into engagement with said catch means, and unidirectional coupling means for coupling said frame and loading means with said film advancing means during the movement of the frame from its end position to its starting position so as to advance the film by the length of a picture, while permitting said frame to move freely from its starting position to its end position under the action of said spring means.

20. An electronic camera comprising a camera housing having a lens at one end of the housing, a pair of film supply and take-up spools arranged in spaced relation to each other at the opposite end of the camera housing, means for guiding a strip of film between said spools across the housing and determining an image receiving surface, means for engagement with such film on its path between said spools for advancing it from said supply spool to said take-up spool, an evacuated envelope having a photocathode adjacent one end and having at its opposite end an end wall formed with a narrow, elongated unsupported electron-pervious material window, said envelope further including a partition wall extending across said envelope and separating in a vacuum-proof manner the part of the envelope containing the photocathode from the part of the envelope in which said electron-pervious window is provided, said partition being formed with a second electron-pervious window having a narrow elongated non-supported area of less width than the non-supported area of the first electron-pervious window, electron-optical means for causing electrons emitted from the whole of a narrow, elongated area of the photocathode to pass through said two electron-pervious windows in succession and form outside said envelope a sharply focussed electron image of said narrow surface area, a frame for supporting said envelope within the camera housing in such spatial relationship to the lens and image-receiving surface that said photocathode surface is located within focussing field of the lens and that said electron image is formed on the image-receiving surface, pivotal supporting means for supporting said frame in the camera so as to be movable about an axis parallel to the longitudinal direction of said windows and perpendicular to the optical axis of the lens and to the direction of said advance movement, spring means for urging said frame to swing about said pivot axis into an end position, catch means for retaining said frame against the action of said spring means in a starting position, trigger means for releasing said catch means, and unidirectional coupling means for coupling said frame with said film advancing means to operate said advancing means during the movement of the frame from its end position to its starting position.

21. An electronic camera comprising a camera housing having a lens at one end of the housing, a film holding means arranged at the opposite ends of the camera housing and determining an image-receiving surface in said housing, an evacuated envelope having a photocathode adjacent one end, the wall of said envelope being formed with a narrow, elongated unsupported electron-pervious material window at the other end of the envelope, a partition wall extending across said envelope and separating in a vacuum-proof manner the part of the envelope containing the photocathode from the part of the envelope in which said electron-pervious window is provided, said partition being formed with a second narrow elongated non-supported electron-pervious window of less width than the first electron-pervious window, electron-optical means, at least some of which are arranged in the part of the envelope containing the first electron-pervious window, for causing electrons emitted from the whole of a narrow, elongated surface area of the photocathode to pass through said two electron windows in succession and form outside the envelope a sharply focussed electron image of the electron-emission pattern of said photocathode surface, means for pivotally supporting said envelope within the camera housing in such spatial relationship to the lens and the film-holding means that said photocathode surface is located within the focussing field of the lens and that said electron image is formed on said image-receiving surface, the pivot axis of said supporting means being parallel to the longitudinal direction of said windows and perpendicular to the optical axis of the lens, spring means for urging said frame to swing about said pivot axis into an end position, catch means for retaining said frame against the action of said spring means in a starting position, and trigger means for releasing said catch means.

References Cited in the file of this patent

UNITED STATES PATENTS

| | | |
|---|---|---|
| 687,592 | Barnell | Nov. 26, 1901 |
| 1,471,357 | Ruben | Oct. 23, 1923 |
| 2,129,959 | Pollock | Sept. 13, 1938 |
| 2,206,387 | Bruche | July 2, 1940 |
| 2,351,889 | Strubig | June 20, 1944 |
| 2,549,546 | Thomas | Apr. 17, 1951 |
| 2,593,088 | Baker | Apr. 15, 1952 |